United States Patent [19]

Serini et al.

[11] Patent Number: 4,902,746
[45] Date of Patent: Feb. 20, 1990

[54] USE OF MIXTURES OF POLYCARBONATES AND STYRENE POLYMERS AS SUBSTRATES FOR OPTICAL STORAGE MEDIA

[75] Inventors: Volker Serini; Klaus Berg, both of Krefeld; Ulrich Grigo, Kempen; Leo Morbitzer, Cologne; Karl-Erwin Piejko, Bergisch Gladbach; Klaus Sümmermann, Froendenberg-Froemern, all of Fed. Rep. of Germany

[73] Assignee: Bayer Aktiengesellschaft, Leverkusen, Fed. Rep. of Germany

[21] Appl. No.: 283,672

[22] Filed: Dec. 13, 1988

[30] Foreign Application Priority Data

Dec. 22, 1987 [DE] Fed. Rep. of Germany ....... 3743491

[51] Int. Cl.$^4$ ............................................. C08L 69/00
[52] U.S. Cl. ..................................... 525/148; 525/67; 525/146
[58] Field of Search ................. 525/148, 146, 67, 468; 528/372, 201

[56] References Cited

U.S. PATENT DOCUMENTS

| | | | |
|---|---|---|---|
| 4,005,037 | 1/1977 | Mietzsch et al. | 260/4 |
| 4,129,612 | 12/1978 | Serini et al. | 528/201 X |
| 4,316,980 | 2/1982 | Idel et al. | 528/199 |
| 4,463,130 | 7/1984 | Serini et al. | 525/67 |
| 4,515,918 | 5/1985 | Nouvertne et al. | 524/504 |
| 4,777,215 | 10/1988 | Wehnert et al. | 525/146 |

FOREIGN PATENT DOCUMENTS 1182236 2/1985 Canada .
0199824 1/1985 European Pat. Off. .
2901668 7/1980 Fed. Rep. of Germany .
3344101 6/1985 Fed. Rep. of Germany .
3430234 2/1986 Fed. Rep. of Germany .
61-19656 1/1986 Japan .

OTHER PUBLICATIONS

J. Hennig, Kunststoffe für Optische Plattenspeicher, Kunststoffe 75, 1985 pp. 425–430 (including translation).
W. Siebourg, Polycarbonat-ein Werkstoff für Optische Speichermedien, 76, 1986, pp. 917–919 (including translation).
Egon Schmidt, Ein Einfacher Magneto-Optischer Speicher, 3/6/87 "Naturwassenschaft und Technik".

Primary Examiner—Theodore E. Pertilla
Attorney, Agent, or Firm—Joseph C. Gil; Aron Preis

[57] ABSTRACT

The invention relates to the use of mixtures consisting of 5 to 95% by weight of an aromatic polycarbonate of which the linear chains contain from 0.1 mol-% to 50 mol-% bifunctional structural units corresponding to formula (1)

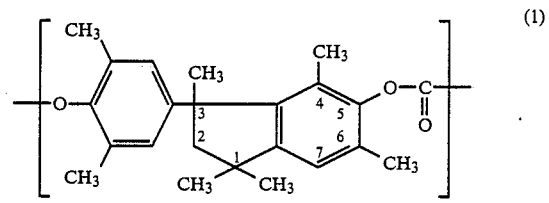

and 95 to 5% by weight of a thermoplastic styrene polymer and, optionally, standard additives as substrates for optical storage media.

6 Claims, No Drawings

USE OF MIXTURES OF POLYCARBONATES AND STYRENE POLYMERS AS SUBSTRATES FOR OPTICAL STORAGE MEDIA

This invention relates to the use of mixtures consisting of (a) 5 to 95% by weight of an aromatic polycarbonate, of which the linear chains contain from 0.1 mol-% to 50 mol-% bifunctional structural units corresponding to formula (1)

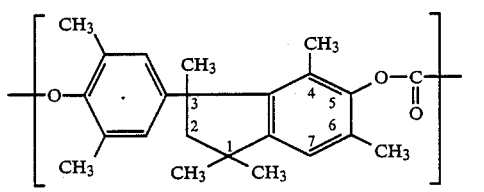

and 99.9 mol-% to 50 mol-% of other bifunctional structural units corresponding to formula (2)

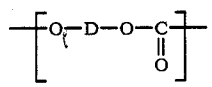

in which —O—D—O— are different diphenolate residues from those in formula (1), (b) 95 to 5% by weight of a thermoplastic styrene polymer and, optionally, (c) standard additives in the usual quantities, the sum of components (a)+(b) being 100% by weight and the quantity of additive (c) being based on 100% by weight of the sum of components (a)+(b), as substrates for optical storage media.

The aromatic polycarbonates useable in accordance with the invention preferably contain 0.2 to 35 mol-%, more preferably 0.5 to 25 mol-% and most preferably 2 to 15 mol-% polycarbonate units of 1,1,3,4,6-pentamethyl-3-(3,5-dimethyl-4-hydroxyphenyl)-indane-5-ol corresponding to formula I.

In the context of the present invention, a polycarbonate is also understood to be a mixture of at least two different polycarbonates, providing the mixture satisfies the requirements stated for the polycarbonate in the claims and in the text. At least one of the polycarbonates of the mixture may also differ from the composition mentioned for the polycarbonate to be used in accordance with the invention, providing the mixture as a whole corresponds to the stated composition. Where at least two polycarbonates are used, they may be mixed together before mixing with the styrene polymer or may even be mixed together with the styrene polymer, for example via the melt.

In the context of the invention, a styrene polymer is also understood to include a mixture of a least two different styrene polymers, the observations made in the foregoing on the mixture of polycarbonates applying to the mixture of styrene polymers.

The polycarbonates of component (a) are known from DE-OS 2 615 038 (Le A 16 842) or may be obtained in accordance with the teaching of DE-OS 2 615 038.

With regard to possible mixtures with plastics which contain no polycarbonates, it is merely pointed out that the polycarbonates containing structural units of formula (I) may be mixed with other polymeric materials (page 10, lines 19/20 of the DE-OS).

There is no mention in the DE-OS of the use of the mixtures as substrates for optical storage media.

The polycarbonates of component (a) are also known from DE-OS 2 901 668 (Le A 19 146). Mixtures or optical uses of these polycarbonates are not mentioned in DE-OS 2 901 668.

The polycarbonates of component (a) are also known from DE-OS 2 901 665 (Le A 19 040). Mixtures of these polycarbonates with other polycarbonates and modifications of these polycarbonates with PVC are mentioned on page 20 of DE-OS 2 901 665. In the case of the modifications, rubber-modified thermoplastic resins may also be added, the resins in question—according to page 9 of DE-OS 2 402 177 cited in DE-OS 2 901 665—also including mixtures of thermoplastic resins with graft polymers or with rubbers. DE-OS 2 901 665 also makes no mention of optical applications.

The polycarbonates of component (a) are also known from DE-OS 3 118 697 (Le A 21 047), page 11, last paragraph and page 12, first paragraph, being mixed with polyalkylene terephthalate and, optionally, polymers having a glass transition temperature below −20° C. DE-OS 3 118 697 also makes no mention of optical applications.

The polycarbonates of component (A) are also known from DE-OS 3 118 861 (Le A 21 048), page 10, paragraph 1, being mixed with graft polymers having a glass transition temperature below −20° C. Optical applications are not mentioned in this DE-OS either.

Mixtures of the polycarbonates of component (a), styrene polymers and polyphosphates are known from EP-OS 0 103 230 (Le A 21 835). However, there is no reference in the EP-OS to optical applications.

Mixtures of the polycarbonates of component (a) with styrene polymers are known from DE-OS 3 344 101 (Le A 22 589). However, DE-OS 3 344 101 makes no mention of any optical application of the mixtures.

Mixtures of the polycarbonates of component (a) with styrene polymers and with phosphate esters are known from EP-OS 0 173 869 (Le A 22 925). However, there is no mention of optical applications.

Japanese published patent application Sho-61-19656 describes mixtures of polycarbonates with styrene resin copolymers which are recommended as starting materials for optical instruments. The polycarbonates are prepared from bisphenols of which several are mentioned, including 2,2-bis-(4'-hydroxy-3',5'-dimethylphenyl)-propane. In the Examples, however, only bisphenol A polycarbonate is used. There is no mention of the indane bisphenol (3)

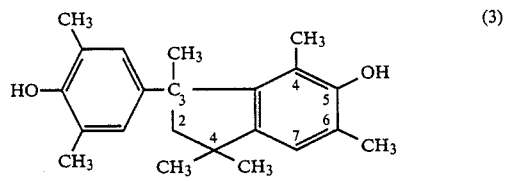

The use of resin mixtures for optical purposes is also described in EP-OS 0 199 824. Both polycarbonates and also styrene resins are mentioned as resins. The compatibility of the various resins is improved by a third component. However, the polycarbonates of component (a)

of the present invention are not mentioned as polycarbonates in EP-OS 0 199 824.

The bifunctional structural units corresponding to formula (2) may be based on any other diphenols than the diphenol correpsonding to formula (3).

Suitable other diphenols corresponding to formula (4) HO—D—OH are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl)-diisopropylbenzenes and corresponding substituted compounds.

The diphenols of formula (4) are either known or may be obtained by known methods (cf. for example Hermann Schnell, Chemistry and Physics of Polycarbonates, Polymer Reviews, Volume 9, Interscience Publishers, New York, 1964, the Article by V. Serini, D. Freitag, H. Vernaleken entitled "Polycarbonate aus o, o, o',o'-tetramethylsubstituierten Bisphenolen (Polycarbonates of o,o,o',o'-tetramethyl-substituted bisphenols), Angew, Makrom. Chem. 55, (1976), 175–189, and DE-OSS 2 063 050, 2 211 957, 2 248 817 and 2 615 038).

Examples of suitable diphenols (4) are 2,2-bis-(4-hydroxyphenyl)-propane, 2,2-bis-(4-hydroxyphenyl)-sulfide, 1,1-bis-(4-hydroxyphenyl)-cyclohexane, 1,1-bis-(4-hydroxyphenyl)-1-phenylethane, α,α'-bis-(4-hydroxyphenyl)-p-diisopropylbenzene, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, bis-(3,5-dimethyl-4-hydroxyphenyl)-methane, 2,2-bis-(3,5-dimethyl-4-hydroxyphenyl)-propane and α,α'-bis-(3,5-dimethyl-4-hydroxyphenyl)-p-diisopropylbenzene.

Preferred diphenols of formula (4) are those corresponding to formula (5)

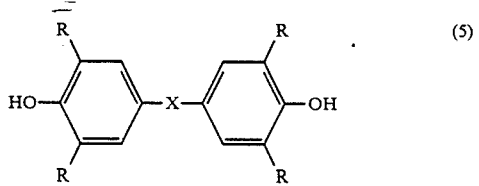
(5)

in which the substituents R independently of one another are $C_1$–$C_3$ alkyl groups, preferably methyl groups, and X is a single bond, O, S, $SO_2$, CO, a $C_1$–$C_{15}$ and preferably $C_1$–$C_5$ alkylene or alkylidene radical, a $C_5$–$C_{15}$ and preferably $C_5$–$C_{10}$ cycloalkylene or cycloalkylidene radical or

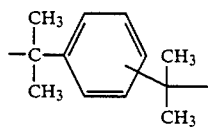

The bifunctional units of formula (2) are preferably based on at least 50 mol-%, more preferably on at least 80 mol-% and most preferably on 100 mol-% of diphenols corresponding to formula (5).

Particularly preferred diphenols (5) are those in which R=$CH_3$ and X is a $C_1$–$C_5$ alkylene radical or a $C_2$–$C_5$ alkylidene radical. Examples of such diphenols are bis-(3,5-dimethyl-4-hydroxyphenyl)-methane, 2,2-bis-(3,5-dimethyl-4-hydroxyphenyl)-propane, 2,2-bis-(3,5-dimethyl-4-hydroxyphenyl)-butane, 2,4-bis-(3,5-dimethyl-4-hydroxyphenyl)-2-methylbutane and α,α'-bis-(3,5-dimethyl-4-hydroxyphenyl)-p-diisopropylbenzene. Of these diphenols, bis-(3,5-dimethyl-4-hydroxyphenyl)-methane, 2,2-bis-(3,5-dimethyl-4-hydroxyphenyl)-propane and 2,2-bis-(3,5-dimethyl-4-hydroxyphenyl)-butane are preferred, 2,2-bis-(3,5-dimethyl-4-hydroxyphenyl)-propane being the particularly preferred diphenol of formula (5).

As mentioned at the beginning, the production of the polycarbonates of component (a) to be used in accordance with the invention is known from the literature.

Chain limiters may be used to regulate the molecular weight of the polycarbonates useable in accordance with the invention. Chain limiters are widely described in the literature. They are monofunctional compounds which are capable of reacting with bisphenols or with the carbonic acid derivative used, such as for example amines, phenols, carboxylic acids and derivatives thereof. Preferred chain limiters are phenols, such as for example phenol, o-cresol, 2,6-dimethylphenol, p-tert.-butylphenol and, in particular, phenols corresponding to the following formula

in which R is a branched $C_8$–$C_9$ alkyl radical, phenols corresponding to the following formula

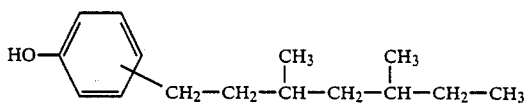

being preferred and phenols corresponding to the following formula

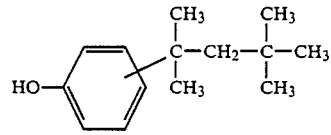

particularly preferred. Of these phenols, p-isooctylphenol, which corresponds to the following formula

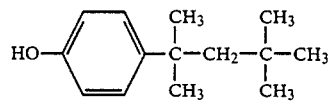

is particularly preferred.

The molecular weights of the polycarbonates useable in accordance with the invention may vary within relatively wide limits. The polycarbonates preferably have molecular weights $M_w$ in the range from 6000 to 125,000, more preferably in the range from 12,000 to 60,000 and most preferably in the range from 17,000 to 43,000, polycarbonates having molecular weights $M_w$ in the range from 21,000 to 31,000 being particularly preferred.

The polycarbonates useable in accordance with the invention may be branched by the incorporation of small quantities, preferably 0.05 to 2 mol-% (based on the diphenols used), of trifunctional or more than trifunctional compounds, particularly those containing three or more than three phenolic hydroxy groups. Polycarbonates of this type are known from the literature. Some of the compounds containing three or more than three phenolic hydroxy groups which may be used in accordance with the invention are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-[4-(4-hyrdroxyphenylisopropyl)-phenyl]-orthoterephthalic acid ester, tetra-(4-hydroxyphenyl)-methane, tetra-[4-(4-hydroxyphenylisopropyl)-phenoxy]-methane and 1,4-bis-[4',4''-dihydroxytriphenyl)-methyl]-benzene. Some of the other trifunctional compounds are 2,4-dihydroxybenzoic acid, trimesic acid, cyanuric chloride, 3,3-bis-(4-hydroxyphenyl)-2-oxo-2,3-dihydroindol and 3,3-bis-(3-methyl-4-hydroxyphenyl)-2-oxo-2,3-dihydroindol.

Instead of the carbonic acid residues, the polycarbonates of component (a) to be used in accordance with the invention may contain other dicarboxylic acid residues in quantities of less than ≦40 mol-%, preferably in quantities of less than ≦25 mol-% and more preferably in quantities of less than ≦10 mol-%, based in each case on the molar sum of acid esters in the polycarbonate.

These other dicarboxylic acid residues may emanate from aliphatic and/or aromatic dicarboxylic acids and preferably from aromatic dicarboxylic acids. Examples of aromatic dicarboxylic acids are isophthalic acid and terephthalic acid and also mixtures thereof.

Instead of the carbonic acid residues, the polycarbonates of component (a) to be used in accordance with the invention may also contain p-hydroxybenzoic acid residues in quantities of ≦25 mol-%, based on the molar sum of acid residues in the polycarbonate.

According to the invention, the thermoplastic styrene polymers of component (b) are polymers which contain at least 30% by weight, preferably at least 45% by weight and more preferably at least 60% by weight of at least one compound from the group comprising styrene and its derivatives in co-polymerized form. Other preferred polymers are those which contain from 65 to 100% by weight, preferably from 65 to 99% by weight, more preferably from 90 to 98% by weight and, most preferably, from 93 to 98% by weight of at least one compound from the group comprising styrene and its derivatives in copolymerized form.

The group of styrene and its derivatives include, for example, styrene, α-methylstyrene, p-methylstyrene, 3,4-dimethylstyrene, o- and p-divinylbenzene, α-chlorostyrene, p-chlorostyrene, 2,4-dichlorostyrene and p-chloro-α-methylstyrene. Styrene, α-methylstyrene and p-methylstyrene are preferred, styrene being particularly preferred.

The thermoplastic styrene polymers according to the invention may contain at least one comonomer in quantities complementary to the above-mentioned quantities of styrene and its derivatives. Suitable comonomers are compounds containing at least one olefinic double bond, such as for example allyl compounds, dienes, vinyl compounds, acrylic and methacrylic compounds and also fumaric and maleic acid and derivatives thereof. It is possible to use both one comonomer and several comonomers in addition to styrene and its derivatives.

Of the comonomers mentioned, the acrylic and methacrylic compounds, such as for example acrylic acid, methacrylic acid, acryl and methacrylamides, butyl acrylate, methyl methacrylate, acrylonitrile and methacrylonitrile, and also the derivatives of maleic acid, such as for example maleic anhydride, α-methyl maleic anhydride, N-methyl maleic imide, N-phenyl maleic imide, N-(p-methylphenyl)-maleic imide, are preferred. Acrylonitrile, methyl methacrylate, maleic anhydride and N-phenyl maleic imide are particularly preferred, acrylonitrile being especially preferred.

The thermoplastic styrene polymers may be prepared by known radical polymerization processes, for example by mass polymerization, solution polymerization, emulsion polymerization, or by combined processes, such as solution, precipitation or mass suspension processes. However, other known processes may also be used to produce the styrene polymers, including for example ionic polymerization processes and processes using organometallic mixed catalysts (Ziegler-Natta process).

The molecular weights of the styrene polymers useable in accordance with the invention may vary within wide limits. The styrene polymers preferably have molecular weights $M_w$ in the range from 5000 to 5,000,000 more preferably in the range from 15,000 to 1,000,000 and most preferably in the range from 20,000 to 200,000.

The thermoplastic styrene polymers useable in accordance with the invention may be linear or branched. Branching may be obtained by the use of branched compounds, for example divinylbenzene, as comonomer or even by the formation of branches by other methods, for example by radical grafting during the polymerization process.

The standard additives of component (c) according to the invention are not the compatibility promoters according to EP-OS 0 199 824, but instead and above all stabilizers against the effects of heat, UV light and moisture for components (a) and (b) of the mixtures of plastics to be used in accordance with the invention. Other suitable additives include flameproofing agents, lubricants and mold release agents and other processing aids, providing they do not affect the optical quality of the mixtures of components (a) and (b).

The production of the molding compositions to be used in accordance with the invention from components (a) and (b) and, optionally, (c) may be carried out from solutions thereof in organic solvents or solvent mixtures with subsequent evaporation of the solvent, for example in evaporation kneaders or evaporation extruders. However, it may also be directly carried out from the melt, for example on mixing rolls, in kneaders or in extruders. The starting components are mixed at melt temperatures generally in the range from 180° to 450° C., preferably in the range from 220° to 400° C., more preferably in the range from 260° to 360° C. and most preferably in the range from 290° to 340° C.

The additives of components (c) may even be subsequently incorporated in the mixture of components (a)+(b).

However, it is also possible to use additive-containing components (a) and (b), i.e. a premix of components (a) and/or (b) with the additives (c).

The thermoplastic molding compositions of components (a), (b) and, optionally, (c) are molded at melt temperatures preferably in the range from 260° to 360° C. and more preferably in the range from 290° to 340° C.

The mixing ratio of polycarbonate to styrene polymer in the mixtures according to the invention is preferably in the range from 90:10 to 20:80, more preferably in the range from 90:10 to 40:60 and most preferably in the range from 85:15 to 75:25, mixing ratios in the range from 65:35 to 45:55 being particularly preferred.

The mixtures to be used in accordance with the invention preferably contain 5 to 80% by weight styrene (as polystyrene and/or the styrene component of the copolymer), more preferably from 10 to 65% by weight and most preferably from 20 to 55% by weight.

The mixtures to be used in accordance with the invention, not least by virtue of their outstanding compatibility, show technically valuable properties which make them suitable for optical applications, particularly in the field of optical storage media.

Examples of such optical storage media are, for example, optical read-only memories (OROM), write-once read-mostly (WORM) and erasable optical discs (EOD). Known OROM applications include video long plays (VLP), audio compact discs (CD), CD read only memories (CD-ROM), CD interactive (CD-I). Erasable optical discs currently use three different mechanisms, namely reversible phase change (PC), reversible color change (CC) and reversible magnetization (magneto optical recording, thermomagneto optic, MOR).

Optical storage media are described, for example, in the following literature references: J. Henning, Kunststoffe für optische Plattenspeicher (Plastics for Optical Discs), Kunststoffe 75, (1985) 7, pages 425–430; W. Siebourg, Polycarbonat-ein Werkstoff für optische Speichermedien (Polycarbonate-A Material for Optical Storage Media), Kunststoffe 76 (1986) 10, pages 917–919); Egon Schmidt, Ein Einfacher magneto-optischer Speicher (A Simple Magneto-Optical Storage Medium), Frankfurter Allgemeine Zeitung of 3.6.1987, under "Naturwissenschaft und Technik".

Optical data storage media generally consist of a polymeric base plate or a polymeric base film (optionally a composite film), to which a layer of information is applied. The information is recalled from the storage medium, recorded on the storage medium or even erased from the storage medium by means of a light beam, for example a laser beam, the light beam passing through the polymer plate or polymer film. Only a few polymers are suitable for use as the base plate or base film of an information-carrying data storage disc or data storage film and even these polymers are limited because they do not show all the required properties.

Hitherto, polymethyl methacrylates and polycarbonates of 2,2-bis-(4-hydroxyphenyl)-propane (bisphenol A) have been used as polymers for the production of base plates or base films for optical storage media. As already mentioned, Japanese published patent application Sho-61-19656 and EP-OS 0 199 824 also describe the use of mixtures of plastics for optical applications.

The use in accordance with the invention of the mixtures of components (a) and (b) and, optionally, (c) is so advantageous because these mixtures have a very favorable property spectrum which is distinguished by:
1. a high heat distortion temperature
2. high fluidity of the melt
3. high surface quality
4. highly accurate reproduction of detail during molding
5. high gloss
6. good metal adhesion
7. high transparency
8. high thermal stability
9. easy mold release
10. minimal double refraction in a disc
11. high uniformity of double refraction over a disc
12. good mechanical properties
13. minimal tendency to form microcracks
14. low water absorption Both individual properties of the favorable properties mentioned and, in particular, the combination of these favorable properties make the molding compositions according to the invention into a base material for optical data storage media of a quality hitherto unavailable.

Of the favorable mechanical properties of the polymer mixtures according to the invention, particular mention is made of their surprisingly high E-moduli which are distinctly above the values which can be determined by calculation from the composition and the E-moduli of the individual components. By virtue of these high E-moduli, the low water absorption, the low double refraction and their high uniformity over the entire disc, it is possible to produce high-quality optical discs larger than 14 cm, preferably larger than 20 cm and more preferably larger than 25 cm in diameter from the polymer mixtures according to the invention.

The molding compositions according to the invention are particularly suitable for optical read-only memories (OROM) but especially for write-once read-mostly (WORM) discs and, in particular, for erasable optical discs (EOD).

EXAMPLES 1 TO 5

Mixtures of 1,1,3,4,6-pentamethyl-3-(3,5-dimethyl-4-hydroxyphenyl)-indane-5-ol copolycarbonates and styrene resins and, for comparison, a mixture of 2,2-bis-(4-hydroxyphenyl)-propane polycarbonate and styrene/maleic anhydride copolymer.

Polymers used:

A. 1,1,3,4,6-pentamethyl-3-(3,5-dimethyl-4-hydroxyphenyl)-indane-5-ol/2,2-bis-(3,5-dimethyl-4-hydroxyphenyl)-propane copolycarbonate 7/93 mol parts (PC-JP), p-isooctylphenol co-condensed as chain limiter, $\eta_{rel}=1.240$ (as measured at 25° C. in methylene chloride, c=5 g/l).

B. 1,1,3,4,6-pentamethyl-3-(3,5-dimethyl-4-hydroxyphenyl)-indane-5-ol/bis-(3,5-dimethyl-4-hydroxyphenyl)-methane copolycarbonate 7/93 mol parts (PC-IM), p-isooctylphenol co-condensed as chain limiter, $\eta_{rel}=1.236$ (as measured at 25° C. in methylene chloride, c=5 g/l).

C. 1,1,3,4,6-pentamethyl-3-(3,5-dimethyl-4-hydroxyphenyl)-indane-5-ol/2,2-bis-(3,5-dimethyl-4-hydroxyphenyl)-butane copolycarbonate 7/93 mol parts (PC-IB), p-isooctylphenol co-condensed as chain limiter, $\eta_{rel}=1.229$ (as measured at 25° C. in methylene chloride, c=5 g/l).

D. 2,2-bis-(4-hydroxyphenyl)-propane polycarbonate (PC-A), p-tert.-butylphenol co-condensed as chain limiter, $\eta_{rel}=1.232$ (as measured at 25° C. in methylene chloride, c=5 g/l).

E. Styrene-acrylonitrile copolymer 94/6 parts by weight (SAN-6), $\overline{M}_w=155,000$ (as measured by gel permeation chromatography).

F. Styrene/acrylonitrile/maleic anhydride copolymer 94/3/3 parts by weight (SAMA 3-3), $\overline{M}_w=175,000$ (as measured by gel permeation chromatography)

G. Styrene/maleic anhydride copolymer 95/5 parts by weight (SMA 5), $\overline{M}_w=195,000$ (as measured by gel permeation chromatography).

H. Styrene-maleic anhydride copolymer 91/9 parts by weight (SMA 9), $\overline{M}_w=250,000$ (as measured by gel permeation chromatography).

J. Styrene/methyl methacrylate copolymer 75/25 parts by weight (SMM 25), $\overline{M}_w=220,000$ (as measured by gel permetion chromatography).

As can be seen from Table 1, the polymers mentioned above were mixed in the melt at 280° C. in a ratio of polycarbonate to styrene polymer of 60:40. The polymer mixtures were then extruded at a melt temperature of 320° C. into compact discs 12 cm in diameter and 0.12 cm thick. The compact discs were then visually examined for transparency and measured for their double refraction. The double refraction was measured at different distances from the center of the disc and also in three directions to the disc (axial, tangential, radial). The results set out in the Table show the extremely low and uniform double refraction of the discs according to the invention whereas the comparison disc gives considerably higher and less uniform double refraction values.

TABLE 1

Double refraction and transparency of the optical storage media according to the invention Evaluation of compact discs, ⌀ 12 cm, thickness 0.12 cm

| Example no. | Polymer mixture 60/40 | Transparency | Double refraction in nm/mm, distance from center of disc | | |
|---|---|---|---|---|---|
| | | | 25 mm 1/2/3 | 40 mm 1/2/3 | 55 mm 1/2/3 |
| 1 | PC-JP/SAN 6 | clear | 0/−143/+151 | 0/−150/+141 | −1/−147/+145 |
| 2 | PC-JP/SAMA 3-3 | clear | 2/−147/+135 | 0/−152/+141 | −1/−143/+151 |
| 3 | PC-JM/SAN 6 | clear | 0/−137/+153 | −1/−145/+142 | −1/−147/+145 |
| 4 | PC-IB/SMA 5 | clear | 1/−140/+136 | 0/−136/+139 | 0/−137/+150 |
| 5 | PC-IP-SMM 25 55/45 parts by weight | clear | 1/−137/+140 | 1/−141/+145 | −1/−140/+138 |
| V | PC-A/SMA 9 (comparison according to JA 61 - 19 656) | hazy | −45/−328/+292 | −35/−356/+356 | +52/−370/+399 |

1 = axial
2 = tangential
3 = radial

The results set out in the Table also shown that, in contrast to the comparison disc, the discs according to the invention are clearly transparent.

EXAMPLES 6–17

Table 2 shows the E-moduli of the polymer mixtures of Examples 1 to 5 (Examples 6 to 10) and of the starting components (Examples 11 to 17). It can be seen that the mixtures show higher E-moduli than can be calculated from the mixing ratio between the starting components and their E-moduli.

| Example | Polymer of polymer mixture 60/40 parts by weight | E-modulus in tension [MPa] |
|---|---|---|
| 6 | PC-JP/SAN 6 | 3 100* |
| 7 | PC-JP/SAMA 3-3 | 3 100* |
| 8 | PC-JM/SAN 6 | 3 100* |
| 9 | PC-JB/SMA 5 | 3 100* |
| 10 | PC-JP/SMM 25 | 3 100* |
| 11 | PC-JP | 2 400 |
| 12 | PC-JM | 2 400 |
| 13 | PC-JB | 2 400 |
| 14 | SAN 6 | 3 300 |
| 15 | SAMA 3-3 | 3 300 |
| 16 | SMA 5 | 3 300 |
| 17 | SMM 25 | 3 300 |

*Calculated value 2760 MPa

We claim:

1. A substrate for optical storage media consisting essentially of
   (a) 5 to 95% by weight of an aromatic polycarbonate resin the linear chains of which contain 0.1–50 mol. % of units corresponding to

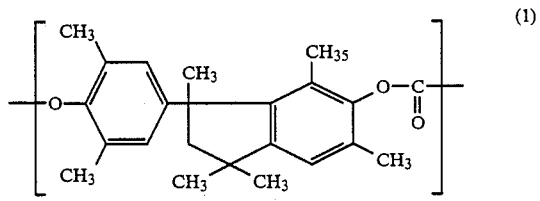

(1)

the balance conforming to

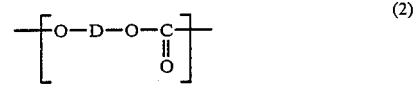

(2)

wherein —O—D—O denotes the residue of a diphenolate other than that in formula (1) and
   (b) 5 to 95% by weight of a thermoplastic styrene polymer.

2. A substrate for optical storage media consisting essentially of
   (a) 5 to 95% by weight of an aromatic polycarbonate resin the linear chains of which contain 0.1–50 mol. % of units corresponding to

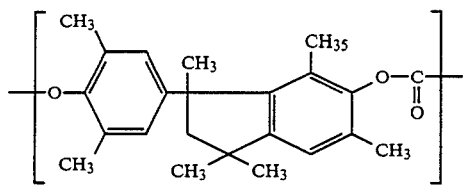 (1)

the balance conforming to

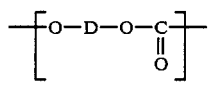 (2)

wherein —O—D—O— denotes the residue of a diphenolate other than in formula (1) and (b) 5 to 95% by weight of a thermoplastic copolymer comprising styrene and at least one comonomer selected from the group consisting of compounds containing at least one olefinic double bond, wherein styrene is present at an amount of 65 to 99% relative to the weight of the copolymer.

3. The substrate of claim 2 wherein said copolymer comprises styrene and maleic anhydride.

4. The substrate of claim 2 wherein said copolymer comprises styrene and methyl methacrylate.

5. The substrate of claim 2 wherein said copolymer comprises styrene and acrylonitrile.

6. The substrate of claim 2 wherein said copolymer comprises styrene, acrylonitrile and maleic anhydride.

* * * * *